(12) United States Patent
Otsuka et al.

(10) Patent No.: US 10,835,964 B2
(45) Date of Patent: Nov. 17, 2020

(54) GRIPPER

(71) Applicant: KITAGAWA IRON WORKS CO., LTD, Hiroshima (JP)

(72) Inventors: Makoto Otsuka, Hiroshima (JP); Shuuji Fujii, Hiroshima (JP)

(73) Assignee: KITAGAWA IRON WORKS CO., LTD, Hiroshima (JP)

( * ) Notice: Subject to any disclaimer, the term of this patent is extended or adjusted under 35 U.S.C. 154(b) by 11 days.

(21) Appl. No.: 16/338,024

(22) PCT Filed: Oct. 5, 2017

(86) PCT No.: PCT/JP2017/036217
§ 371 (c)(1),
(2) Date: Mar. 29, 2019

(87) PCT Pub. No.: WO2018/066627
PCT Pub. Date: Apr. 12, 2018

(65) Prior Publication Data
US 2020/0023480 A1    Jan. 23, 2020

(30) Foreign Application Priority Data

Oct. 5, 2016  (JP) .................................. 2016-196949

(51) Int. Cl.
*B23B 31/177*    (2006.01)
(52) U.S. Cl.
CPC ... *B23B 31/16254* (2013.01); *Y10T 279/1224* (2015.01); *Y10T 279/1291* (2015.01); *Y10T 279/1973* (2015.01)
(58) Field of Classification Search
CPC ......... B23B 31/16254; Y10T 279/1224; Y10T 279/1291; Y10T 279/1973
See application file for complete search history.

(56) References Cited

U.S. PATENT DOCUMENTS

| 2,828,134 | A | * | 3/1958 | Buck | ................ | B23B 31/16233 |
| | | | | | | 279/119 |
| 2,948,541 | A | | 8/1960 | Reich | | |
| 4,249,459 | A | | 2/1981 | Pruden | | |
| 4,275,892 | A | * | 6/1981 | Rohm | ..................... | B23B 31/14 |
| | | | | | | 279/121 |
| 4,447,180 | A | * | 5/1984 | Pesch | ................ | B23B 31/16254 |
| | | | | | | 279/111 |

(Continued)

FOREIGN PATENT DOCUMENTS

| CN | 101920350 B | 12/2011 |
| DE | 1752226 A1 | 5/1971 |

(Continued)

OTHER PUBLICATIONS

Extended European search report dated Aug. 26, 2019, in corresponding European patent application No. 17858463.7; 6 pages.

(Continued)

*Primary Examiner* — Eric A. Gates
(74) *Attorney, Agent, or Firm* — Maier & Maier, PLLC (57) ABSTRACT

The disclosure provides a compact and low-cost gripper which allows an outside diameter of a piston to be increased. Provided is a gripper including a body case having, at one end, a cylinder part having a cylinder chamber which houses a piston so as to slide the piston along a central axis of the piston, and having, at the other end, a plurality of guide parts formed at regular intervals around the center axis and extending in a direction orthogonal to the center axis; a plurality of master jaws, on which top jaws can be removably mounted, guided by each of the guide parts; and a plunger having a plurality of interconnecting means which are respectively interconnected with each of the master jaws and slides along the central axis associated with a sliding operation of the piston.

4 Claims, 5 Drawing Sheets

(56) References Cited

U.S. PATENT DOCUMENTS

| | | | | |
|---|---|---|---|---|
| 4,700,957 A * | 10/1987 | Kempken | ......... | B23B 31/16116 |
| | | | | 279/117 |
| 4,723,778 A * | 2/1988 | Kobayashi | ........... | B23Q 11/123 |
| | | | | 279/4.04 |
| 5,197,748 A * | 3/1993 | Wu | ................... | B23B 31/16254 |
| | | | | 279/121 |
| 8,016,298 B2 * | 9/2011 | Tajnafoi | ............ | B23B 31/16233 |
| | | | | 279/120 |
| 8,087,675 B2 * | 1/2012 | Korson | ................ | B23B 31/003 |
| | | | | 279/121 |
| 2018/0290267 A1* | 10/2018 | Kirsten | ............. | B23B 31/16254 |

FOREIGN PATENT DOCUMENTS

| | | | | |
|---|---|---|---|---|
| DE | 4023591 A1 * | 1/1992 | ....... | B23B 31/16254 |
| GB | 2283189 A | 5/1995 | | |
| JP | S64-38278 U | 3/1989 | | |
| JP | 2515626 Y2 | 10/1996 | | |
| JP | H11-114866 A | 4/1999 | | |
| JP | 2016-120532 A | 7/2016 | | |
| JP | 2018058155 A * | 4/2018 | | |
| JP | 2018058156 A * | 4/2018 | | |
| JP | 2018058157 A * | 4/2018 | | |
| JP | 2018075695 A * | 5/2018 | | |
| WO | WO-9629170 A1 * | 9/1996 | ....... | B23B 31/16254 |
| WO | 2015/022415 A1 | 2/2015 | | |
| WO | WO-2019142709 A1 * | 7/2019 | ............. | B25J 15/04 |

OTHER PUBLICATIONS

International Search Report dated Dec. 19, 2017 in corresponding International Application No. PCT/JP2017/036217; 4 pages.

* cited by examiner

GRIPPER

TECHNICAL FIELD

The present invention relates to a gripper mounted, for example, to an arm tip part of an industrial robot and used to grip an object to be gripped.

BACKGROUND ART

A conventional gripper, for example, a gripper disclosed in PTL 1, comprises a bottomed cylindrical first case and a second case disposed on an opening side of the first case and having an approximately triangular shape when viewed from a direction along a centerline of the first case.

CITATION LIST

Patent Literature

[PTL 1] JP-A-2016-120532

SUMMARY OF INVENTION

Technical Problem

On an inner peripheral surface of a cylindrical member in the first case of PTL 1, an annular recessed groove extending in a peripheral direction is formed at a position closer to an opening on a side of the cylindrical member opposite to the second case. After the piston is housed inside the cylindrical member, a cap member is fitted into an opening on the side of the cylindrical member opposite to the second case, and a stopper ring is fitted into the annular recessed groove, so that a piston is incorporated into a body case.

However, in a structure as described above, a thickness of a peripheral wall of the cylindrical member needs to be larger than a depth of the annular recessed groove, while an outside diameter of the piston needs to be smaller than a part where the annular recessed groove is formed in the cylindrical member in order to house the piston inside the cylindrical member. Consequently, the problem arises that it is difficult to make the first case compact while increasing the outside diameter of the piston.

In addition, the cylindrical member, the cap member, and the stopper ring are required for the first case in PTL 1, and thus the number of components and component cost are increased.

The present invention has been made in view of such circumstances and is to provide a compact and low-cost gripper which allows an outside diameter of a piston to be increased.

Solution to Problem

According to the present invention, provided is a gripper comprising: a body case having, at one end, a cylinder part having a cylinder chamber which houses a piston so as to slide the piston along a central axis of the piston, and having, at the other end, a plurality of guide parts formed at regular intervals around the center axis and extending in a direction orthogonal to the center axis; a plurality of master jaws, on which top jaws can be removably mounted, guided by each of the guide parts; and a plunger having a plurality of interconnecting means which are respectively interconnected with each of the master jaws and slides along the central axis associated with a sliding operation of the piston, wherein: the gripper is configured such that each of the interconnecting means moves, by a sliding operation of the plunger, each of the master jaws in either direction along each of the guide parts, so as to cause each of the top jaws to grip a workpiece or to release the gripped workpiece; the body case has a first case which is provided on one side of the central axis and formed so that the cylinder chamber opens to the other side of the central axis, and a second case which is provided on the other side of the central axis and has each of the guide parts; and the second case is fixed to the first case so as to cover an opening of the first case on a side of the second case.

In the present invention, it is not necessary to form an annular recessed groove on a first case as in PTL 1. It is thus possible to reduce a thickness of a peripheral wall in an outer peripheral wall of the first case without increasing an outside diameter of the outer peripheral wall of the first case. Consequently, the body case can be formed into a compact shape, and an outside diameter of the piston can be increased.

Preferably, the first case is processed as one component.

Preferably, the first case has a plate-shaped bottom and an outer peripheral wall which extends cylindrically from an outer peripheral edge of the bottom to the side of the second case.

Preferably, each of the guide parts of the second case is provided with a projection projecting on an outer side of an outer peripheral surface of the cylinder part, and mounting parts for mounting the body case to a fitting body are provided on a first case side of the projections.

DESCRIPTION OF EMBODIMENTS

Hereinafter, embodiments of the present invention will be described in detail with reference to the drawings. The following description of the preferred embodiments are merely examples.

FIGS. 1 to 4 shows a gripper 1 according to an embodiment of the present invention. The gripper 1 is for gripping a workpiece W, for example, when transporting the workpiece W by means of an industrial robot (not illustrated). The gripper 1 comprises a body case 2 mounted to an arm tip part 10 (fitting body) of an industrial robot which has a mounting opening 10a at the front edge thereof.

The body case 2 comprises a bottomed cylindrical first case 3 (cylinder part) and a second case 4 disposed on an opening side of the first case 3 and having an approximately triangular shape when viewed from a direction along a centerline C1 (central axis) of the first case 3.

That is, in the gripper 1, the first case 3 is provided at one end of the body case 2, while the second case 4 is provided at the other end of the body case 2. The gripper 1 is mounted to the arm tip part 10 and used so that one end of the body case 2 faces the arm tip part 10.

Figure 3:
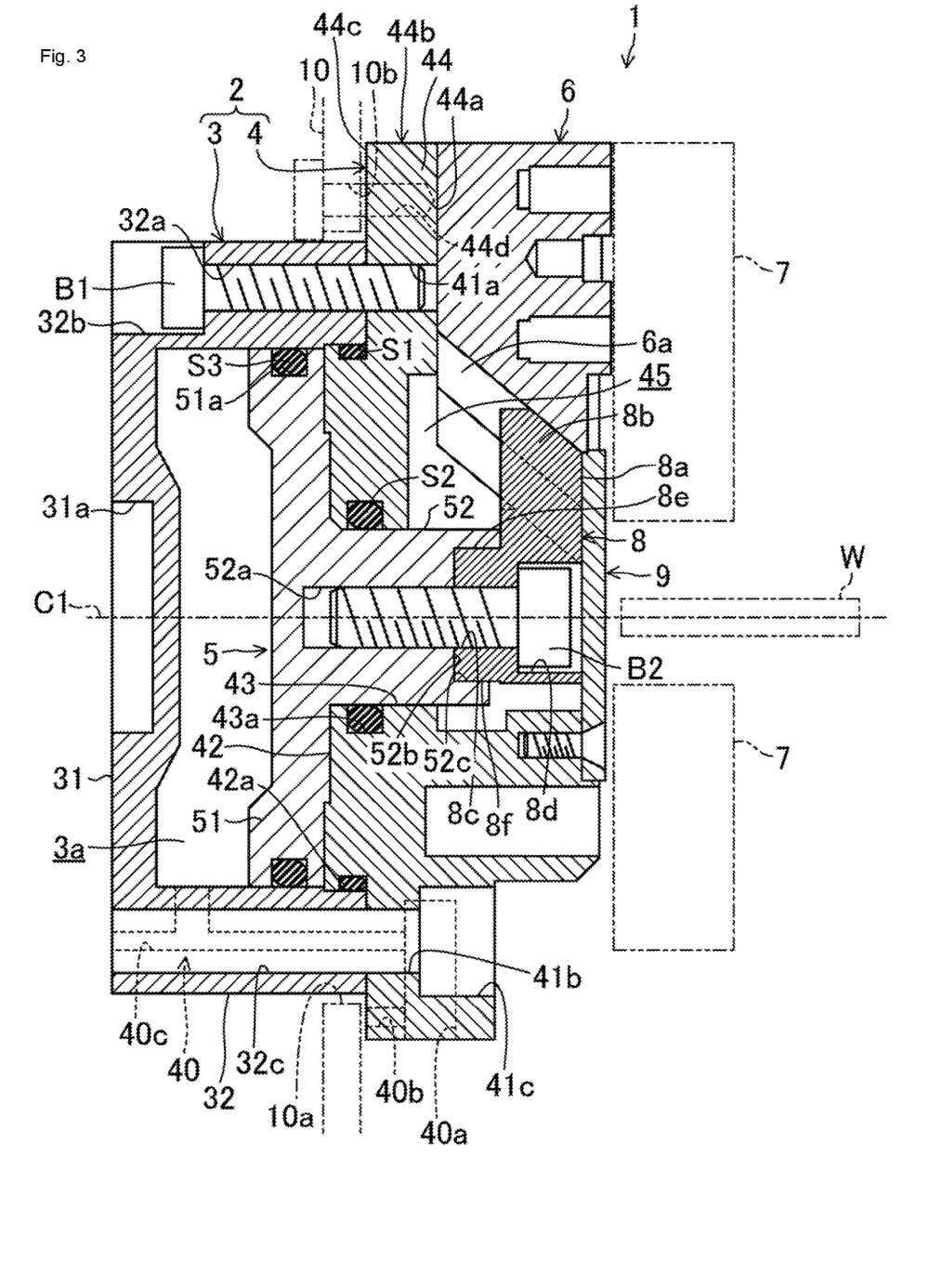
FIG. 3 is a cross-sectional view taken along a line in FIG. 1.
Figure 4:
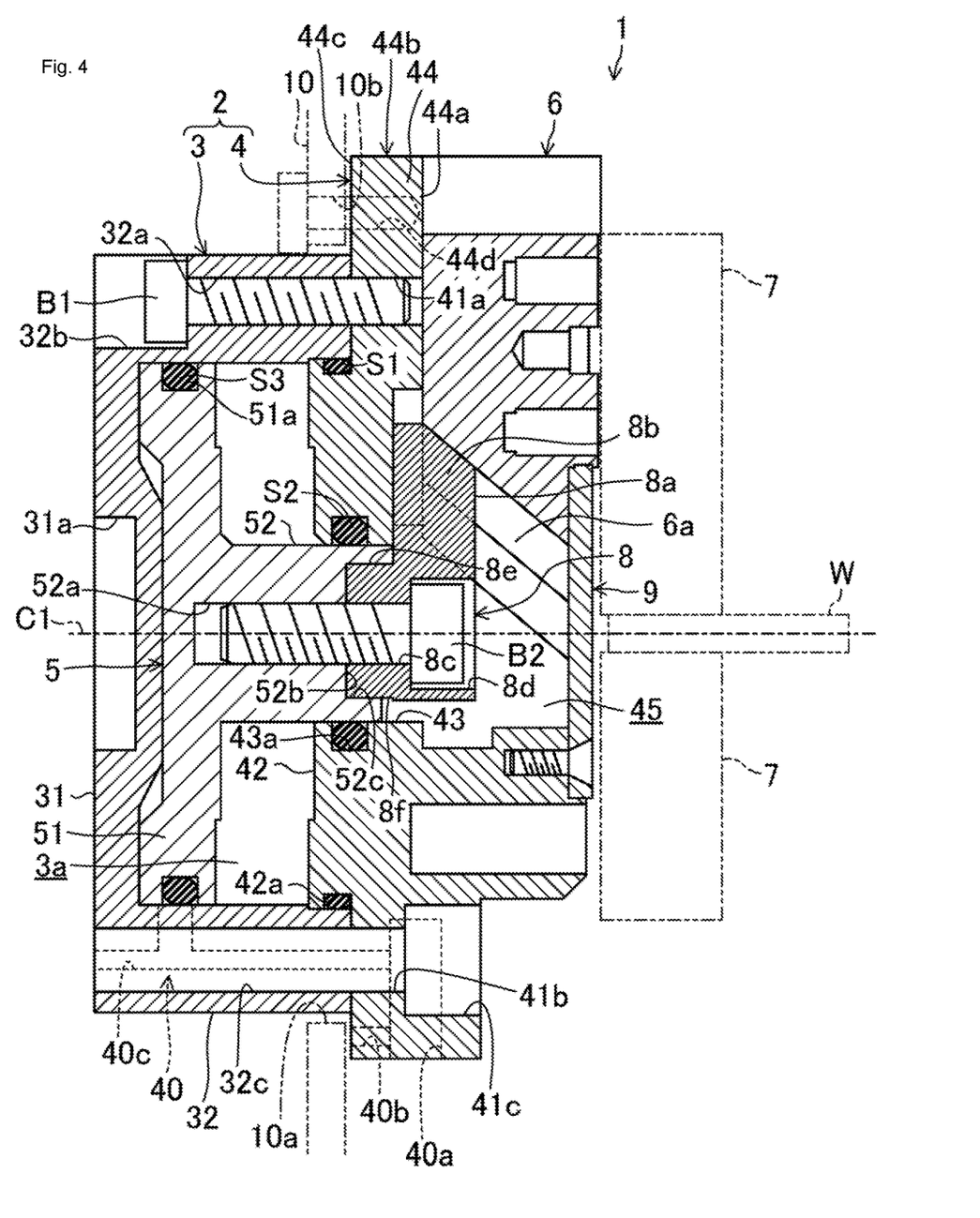
FIG. 4 illustrates a state in which a workpiece is gripped in a view corresponding to FIG. 3.

The first case 3 is processed as one component by cutting out an aluminum material. As illustrated in FIGS. 3 and 4, the first case 3 comprises a disk-shaped circular bottom 31 and an outer peripheral wall 32 which extends cylindrically from an outer peripheral edge of the circular bottom 31 to a second case 4 side.

A circular recess 31a is formed at a central portion of the circular bottom 31 opposite to the second case 4.

Three first insertion holes 32a penetrating in a same direction as the centerline C1 are formed, at regular intervals around the centerline C1, in the outer peripheral wall 32. First counterbored parts 32b are respectively formed in openings of the first insertion holes 32a on a circular bottom 31 side.

First mounting holes 32c penetrating in a same direction as the centerline C1 are respectively formed between each of the first insertion holes 32a in the outer peripheral wall 32.

Furthermore, on both peripheral sides of two of the first mounting holes 32c in the outer peripheral wall 32, a pair of engaging grooves 32d are formed which respectively extend linearly in a same direction as the centerline C1 and have a C-shaped cross section. A detection sensor (not illustrated) capable of detecting a slide position of piston 5 described later can be engaged with each of the engaging grooves 32d.

The second case 4 is as one component by cutting out an aluminum material. The second case 4 is configured to cover an opening of the first case 3 on a second case 4 side while a center of the second case 4 is aligned with the centerline C1.

First screw holes 41a are respectively formed at positions corresponding to the first insertion holes 32a of the second case 4.

First fastening bolts B1 are respectively inserted from a first counterbored part 32b side into the first insertion holes 32a, and screwed into the first screw holes 41a, so that the first case 3 and the second case 4 are integrally fixed. A portion surrounded by the first case 3 and the second case 4 constitutes a cylinder chamber 3a.

Second mounting holes 41b are respectively formed at positions corresponding to the first mounting holes 32c of the second case 4.

Second counterbored parts 41c are respectively formed in openings of the second mounting holes 41b opposite to the first case 3. Fastening bolts (not illustrated) are respectively inserted from a second counterbored part 41c side into the first mounting holes 32c and the second mounting holes 41b and screwed into screw holes (not illustrated) of the arm tip part 10, so that the gripper 1 can be fixed to the arm tip part 10.

Figure 1:
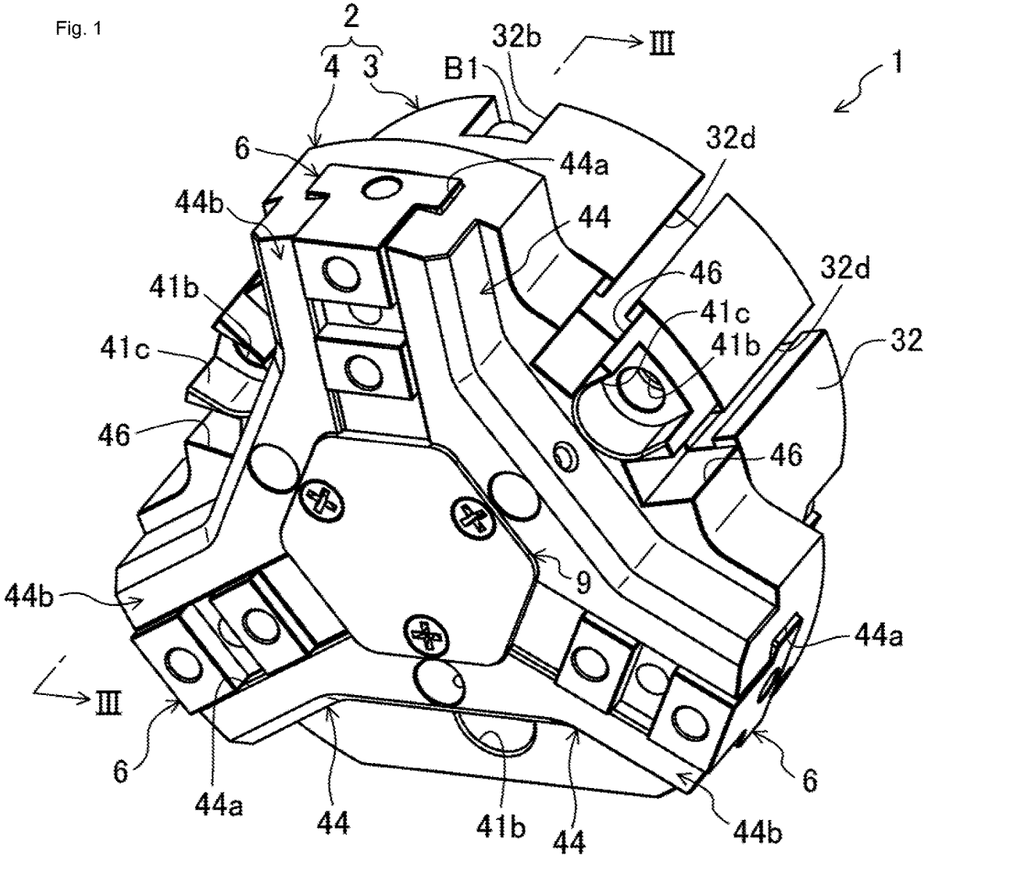
FIG. 1 is a perspective view of a gripper according to an embodiment of the present invention.
Figure 2:
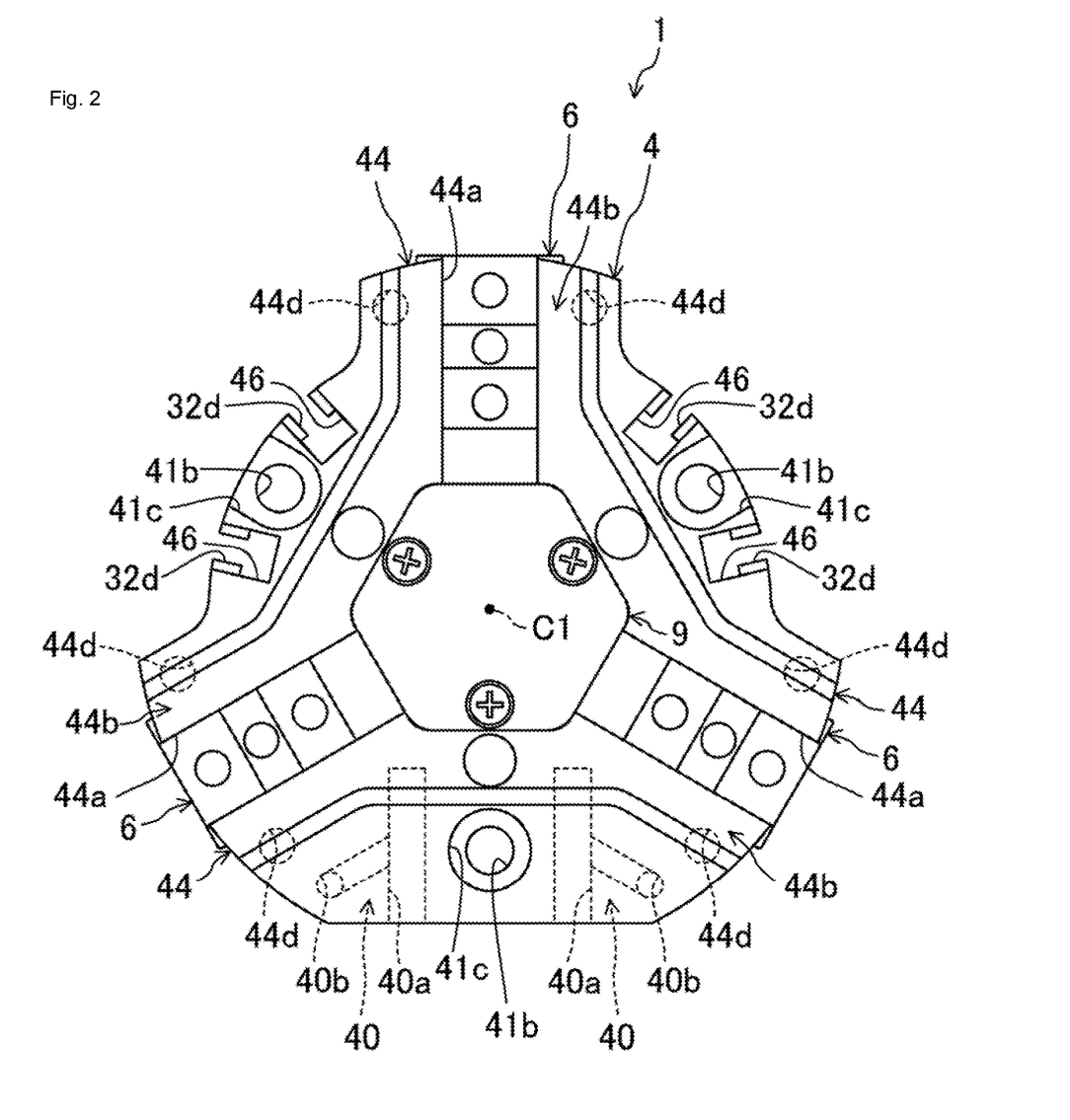
FIG. 2 is a front view of the gripper according to the embodiment of the present invention.

As shown in FIGS. 1 and 2, recessed groove parts 46 having a U-shaped cross section are respectively formed at positions corresponding to the engaging grooves 32d in the second case 4. A groove width of the recessed groove parts 46 is wider than a groove width of the engaging grooves 32d.

As illustrated in FIGS. 3 and 4, an overhanging stepped part 42 overhanging the cylinder chamber 3a in a stepped shape is formed in a portion corresponding to the cylinder chamber 3a of the second case 4.

A first annular recessed groove 42a which opens radially outward and extends around the centerline C1 is formed on an outer peripheral surface of the overhanging stepped part 42. In the first annular recessed groove 42a, an annular first seal member 51 made of rubber is fitted to seal between an inner peripheral surface of the outer peripheral wall 32 and the outer peripheral surface of the overhanging stepped part 42.

A slide hole 43 penetrating along the centerline C1 is formed at a position corresponding to the centerline C1 of the second case 4.

A second annular recessed groove 43a which opens to the inside of the slide hole 43 and extends around the centerline C1 is formed on an inner peripheral surface of the slide hole 43. A second seal member S2 made of rubber is fitted in the second annular recessed groove 43a.

On a side of the second case 4 opposite to the first case 3, three guide parts 44 extending in a direction orthogonal to the centerline C1 are formed at regular intervals around the centerline C1. Each of the guide parts 44 is positioned between each of the second mounting holes 41b in the second case 4.

The guide parts 44 are connected to each other on a centerline C1 side. In this portion where the guide parts 44 are connected to each other, a housing space 45 which opens on a side opposite to the first case 3 and leads to the slide hole 43 is formed.

Guide grooves 44a having a T-shaped cross section are respectively formed in the guide parts 44. Each of the guide grooves 44a opens to a side opposite to the first case 3 and extends along each of the guide parts 44.

That is, each of the guide parts 44 has an approximately C-shaped cross section. One end of each of the guide grooves 44a is open to the housing space 45, while the other end of each of the guide grooves 44a is open to an outer side of the second case 4.

Furthermore, projections 44b projecting on an outer side of an outer peripheral surface of the outer peripheral wall 32 are provided on a side of the guide parts 44 opposite to the centerline C1. Flat mounting surfaces 44c are provided on a first case 3 side of the projections 44b so as to abut on a surface around an opening of the mounting opening 10a when the body case 2 is mounted to the arm tip part 10.

A pair of second screw holes 44d are formed at positions closer to both side edges of each of the mounting surfaces 44c. The gripper 1 can be fixed to the arm tip part 10 by inserting fastening bolts (not illustrated) into through holes 10b of the arm tip part 10 and by screwing the fastening bolts into the second screw holes 44d.

Furthermore, a pair of air supply/discharge passages 40 are formed for supplying air to or discharging air from the cylinder chamber 3a, in a portion between each of the first insertion holes 32a of the body case 2 where the engaging grooves 32d are not formed.

One end of each of the air supply/discharge passages 40 is connected to the cylinder chamber 3a. On the other hand, the other end of each of the air supply/discharge passages 40 branches into a first passage 40a, a second passage 40b, and a third passage 40c.

As illustrated in FIGS. 2 to 4, the first passages 40a are open to an outer peripheral edge of the second case 4. The second passages 40b are open to the mounting surfaces 44c. Furthermore, the third passages 40c are open to the circular bottom 31.

In this regard, when using the gripper 1, air pipes (not illustrated) are connected to one of the first passages 40a, the second passages 40b, and the third passages 40c, and openings of the other two passages are closed.

As illustrated in FIGS. 3 and 4, the piston 5 having an approximately T-shape when viewed from a direction orthogonal to the centerline C1 is housed in the cylinder chamber 3a so that a central axis of the piston 5 coincides with the centerline C1 of the first case 3.

The piston 5 is configured to slide along the centerline C1 by supplying air to or discharging air from the cylinder chamber 3a.

The piston 5 comprises a disc part 51 whose outer peripheral surface faces the inner peripheral surface of the outer peripheral wall 32, and a round bar-shaped sliding shaft part 52 projecting from a central portion of the disc part 51 to a side opposite to the circular bottom 31. The disc part 51 is configured to divide the cylinder chamber 3a into one end side and the other end side of the body case 2.

A third screw hole 52a opening to a projection end of the sliding shaft part 52 is formed on the sliding shaft part 52.

An annular stepped part 52b annularly extending along an opening peripheral edge of the third screw hole 52a is formed at the projection end of the sliding shaft part 52. A flat surface part 52c is formed on an inner peripheral surface of the annular stepped part.

The sliding shaft part 52 is slidably fitted in the slide hole 43, and the second seal member S2 seals between an outer peripheral surface of the sliding shaft part 52 and the inner peripheral surface of the slide hole 43.

A third annular recessed groove 51a which opens radially outward and extends around the centerline C1 is formed on an outer peripheral surface of the disc part 51. In the third annular recessed groove 51a, an annular third seal member S3 made of rubber is fitted to seal between the inner peripheral surface of the outer peripheral wall 32 and the outer peripheral surface of the disc part 51.

Round bar-shaped master jaws 6 having an approximately T-shaped cross section are slidably fitted respectively in guide grooves 44a of the guide parts 44. Each of the master jaws 6 is configured to be guided in a direction orthogonal to the centerline C1 by each of the guide parts 44.

Notched grooves 6a having an approximately T-shaped cross section in a direction orthogonal to the centerline C1 are formed on the centerline C1 side of the master jaws 6. The notched grooves 6a have a shape extending obliquely so as to be gradually farther from the centerline C1 toward the first case 3.

Top jaws 7 extending in a direction orthogonal to the centerline C1 are removably mounted to the master jaws 6 on a side opposite to the first case 3.

Figure 5:
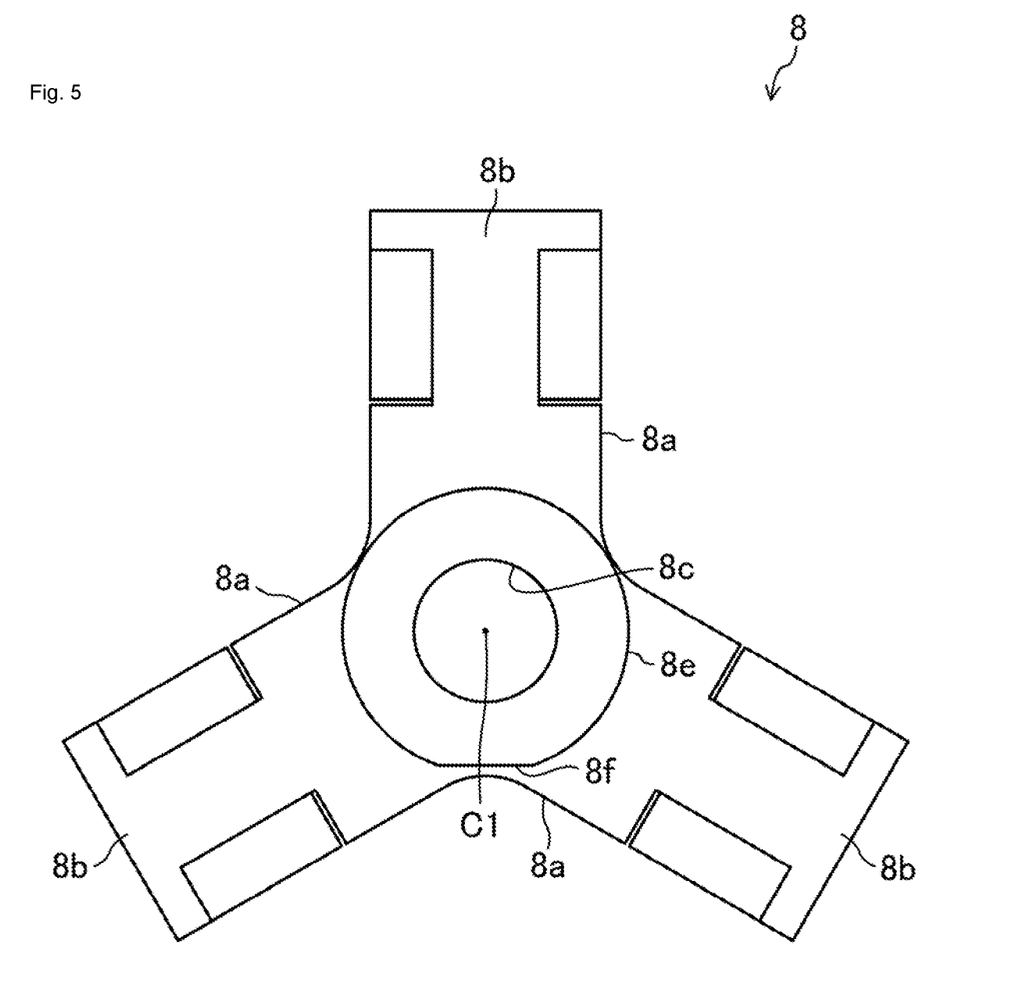
FIG. 5 illustrates a plunger from a first case side.

As illustrated in FIG. 5, a plunger 8 having a radial shape when viewed from a direction along the centerline C1 is housed in the housing space 45. An opening of the housing space 45 is covered with a cover plate 9 having an approximately regular hexagonal shape when viewed from a direction along the centerline C1.

Square bar-shaped extension parts 8a (interconnecting means) extending toward each of the master jaws 6 are provided at positions corresponding to each of the master jaws 6 of the plunger 8.

Approximately T-shaped fitting slide parts 8b whose cross sections correspond to the notched grooves 6a are formed on an extension end side of each of the extension parts 8a. As illustrated in FIGS. 3 and 4, each of the fitting slide parts 8b is slidably fitted in each of the notched grooves 6a.

That is, each of the extension parts 8a of the plunger 8 is interconnected with each of the master jaws 6.

A third mounting hole 8c penetrating along the centerline C1 is formed at a position corresponding to the sliding shaft part 52 of the plunger 8. A third counterbored part 8d is formed on a side of the third mounting hole 8c opposite to the first case 3.

An annular projection part 8e projecting annularly from an opening peripheral edge of the third mounting hole 8c is provided on a piston 5 side of the plunger 8. The annular projection part 8e can be fitted in the annular stepped part 52b.

A flat engaging surface 8f is formed on a lateral surface of the annular projection part 8e. The engaging surface 8f is configured to be engaged with the flat surface part 52c when the annular projection part 8e is fitted in the annular stepped part 52b.

A second fastening bolt B2 is inserted from a third counterbored part 8d side into the third mounting hole 8c and fitted in a third screw hole 52a of the sliding shaft part 52, so that the piston 5 and the plunger 8 are integrally fixed. The plunger 8 is configured to slide along the centerline C1 associated with a sliding operation of the piston 5 in the cylinder chamber 3a.

As shown in FIG. 4, when the plunger 8 is slid to one side in the work with an industrial robot on which the gripper 1 is mounted, the fitting slide parts 8b of the extension parts 8a of the plunger 8, in sliding contact with the notched grooves 6a of the master jaws 6, press the master jaws 6 toward the centerline C1.

The master jaws 6 are configured to approach the centerline C1 with a guide by the guide grooves 44a of the guide parts 44 when being pushed toward the centerline C1 by the fitting slide parts 8b, so that the top jaws 7 grip the workpiece W.

Meanwhile, as shown in FIG. 3, when the plunger 8 is slid to the other side, the fitting slide parts 8b of the extension parts 8a of the plunger 8, in sliding contact with the notched grooves 6a of the master jaws 6, press the master jaws 6 to a side opposite to the centerline C1.

The master jaws 6 are configured to move away from the centerline C1 with a guide by the guide grooves 44a of the guide parts 44 when being pushed to a side opposite to the centerline C1 by the fitting slide parts 8b, so that the top jaws 7 release the gripped workpiece W.

In this regard, the gripper 1 according to the embodiment of the present invention is configured such that the top jaws 7 presses the workpiece W from the outer peripheral surface side thereof by causing the master jaws 6 to approach the centerline C1. The gripper 1 is also configured such that, when an internal space having an opening is provided in the workpiece W, the top jaws 7 can press the workpiece W from the inner peripheral surface side thereof to grip the workpiece W by inserting the top jaws 7 of the gripper 1 from the opening into the internal space of the workpiece W and by causing the master jaws 6 to move away from the centerline C1.

That is, the gripper 1 according to the embodiment of the present invention is configured such that the top jaws 7 grip the workpiece W or release the gripped workpiece W by causing the extension parts 8a to move, by a sliding operation of the plunger 8, the master jaws 6 in either direction along the guide parts 44.

Projection ends of the projections 44b in the guide parts 44 are at positions close to end surfaces of the master jaws 6 on a side farther from the centerline C1 when the master jaws 6 move in a direction away from the centerline C1.

As described above, according to the embodiment of the present invention, it is not necessary to form an annular recessed groove on the first case 3 as in PTL 1. It is thus possible to reduce a thickness of a peripheral wall in the outer peripheral wall 32 of the first case 3 without increasing an outside diameter of the outer peripheral wall 32 of the first case 3. Consequently, the body case 2 can be formed into a compact shape, and an outside diameter of the piston 5 can be increased. Furthermore, since the first case 3 is processed as one component, there is no need to configure the first case 3 with three components as in PTL 1, and the gripper 1 can be made at low cost.

Furthermore, the outer peripheral wall 32 of the first case 3 has a shape extending cylindrically from the outer peripheral edge of the circular bottom 31 to the second case 4 side, and the circular bottom 31 is positioned at an end part of the outer peripheral wall 32 opposite to the second case. It is thus possible to shorten a dimension of the first case 3 in a direction along the centerline C1 without reducing a cylinder capacity of the cylinder chamber 3a, in comparison with a structure disclosed in PTL 1. Consequently, the entire gripper 1 can be compact.

In addition, in a state where the gripper 1 is mounted to the arm tip part 10, a distance from a mounting portion of the gripper 1 on the arm tip part 10 to a gripping portion of the workpiece W in the gripper 1 is shortened. As a result, the arm tip part 10 around the gripper 1 can be formed into a compact shape, and moment applied to the body case 2 by the gripped workpiece W can be reduced. Meanwhile, a portion having the cylinder chamber 3a and a portion having the guide parts 44 have different outside diameters, and these portions having the different outside diameters are independent components. As a result, material yield can be improved, processing time of the body case 2 can be reduced, and thus a structure with low cost can be realized.

In the embodiment of the present invention, the gripper 1 is mounted to the arm tip part 10 of the industrial robot and used. The present invention is not limited to such an embodiment, and for example, the gripper 1 may be mounted to an automatic machine or the like.

Furthermore, while the three guide parts 44 are provided around the centerline C1 according to the embodiment of the present invention, only two guide parts 44, or four or more guide parts 44 may be provided.

Furthermore, while air as a fluid is supplied to and discharged from the cylinder chamber 3a according to the embodiment of the present invention, liquid, such as oil, as a fluid may be supplied to and discharged from the cylinder chamber 3a.

In addition, according to the embodiment of the present invention, the first case 3 has a bottomed cylindrical shape and comprises the disk-shaped circular bottom 31 and the outer peripheral wall 32 extending cylindrically from the outer peripheral edge of the circular bottom 31 to the second case 4 side. The present invention is not limited to such an embodiment, and for example, the first case 3 may have a bottomed square tubular shape and comprise a rectangular plate-shaped bottom and an outer peripheral wall extending in a square tubular shape from an outer peripheral edge of the bottom to the second case 4 side.

INDUSTRIAL APPLICABILITY

The present invention is suitable for, for example, a gripper mounted to an arm tip part of an industrial robot and used to grip an object to be gripped.

While various embodiments have been described above, they have been presented by way of example and are not intended to limit the scope of the invention. The novel embodiments may be embodied in other various forms. Various omissions, substitutions, and changes can be made without departing from gist of the invention, and such embodiments and modifications thereof are included in the gist and the scope of the invention specified in claims and the scope of equivalent of the invention.

REFERENCE SIGN LIST

1 Gripper
2 Body case
3 First case (cylinder part)
3a Cylinder chamber
4 Second case
5 Piston
6 Master jaws
7 Top jaws
8 Plunger
8a Extension parts (interconnecting means)
10 Arm tip part (fitting body)
31 Circular bottom
32 Outer peripheral wall
44 Guide parts
44b Projections
44d Second screw holes (mounting parts)
C1 Centerline (central axis)
W Workpiece

The invention claimed is:

1. A gripper comprising:
a body case having, at one end, a cylinder chamber which houses a piston so as to slide the piston along a central axis of the piston, and having, at the other end, a plurality of guide parts formed at regular intervals around the center axis and extending in a direction orthogonal to the center axis;
a plurality of master jaws, on which top jaws can be removably mounted, guided by each of the guide parts; and
a plunger having a plurality of interconnecting means which are respectively interconnected with each of the master jaws and slides along the central axis associated with a sliding operation of the piston, wherein:
the gripper is configured such that each of the interconnecting means moves, by a sliding operation of the plunger, each of the master jaws in either direction along each of the guide parts, so as to cause each of the top jaws to grip a workpiece or to release the gripped workpiece;
the body case has
a first case having an opening formed so that the cylinder chamber is opened, and
a second case having the plurality of the guide parts and provided to be lined up in a direction parallel to the central axis with respect to the first case; and
the second case is fixed to the first case so as to cover the opening of the first case,
each of the guide parts has
a contact part contacting with the first case, and
a projection connected to the contact part, the projection projecting in the direction orthogonal to the center axis from an outer peripheral surface of the first case, the projection having a mounting surface,
each of the mounting surface is provided with a mounting part for mounting the body case to a fitting body, and each of the mounting surface is provided on a side opposite a side where the plurality of the master jaws are provided.

2. The gripper of claim 1, wherein the first case is processed as one component.

3. The gripper of claim 2, wherein the first case has a plate-shaped bottom and an outer peripheral wall which extends cylindrically from an outer peripheral edge of the bottom to the side of the second case.

4. The gripper of claim 1, wherein the first case has a plate-shaped bottom and an outer peripheral wall which extends cylindrically from an outer peripheral edge of the bottom to the side of the second case.

* * * * *